US007159047B2

(12) United States Patent
Klecka et al.

(10) Patent No.: US 7,159,047 B2
(45) Date of Patent: Jan. 2, 2007

(54) NETWORK WITH PROGRAMMABLE INTERCONNECT NODES ADAPTED TO LARGE INTEGRATED CIRCUITS

(75) Inventors: Mark Klecka, DeKalb, IL (US); Kamal Khadiri, Aurora, IL (US); Robert Patti, Warrenville, IL (US); Derrick Brent Wilson, Chicago Ridge, IL (US); Lee Hoyman, Chicago, IL (US); Bruce Tyda, Chicago, IL (US)

(73) Assignee: Tezzaron Semiconductor, Naperville, IL (US)

( * ) Notice: Subject to any disclaimer, the term of this patent is extended or adjusted under 35 U.S.C. 154(b) by 322 days.

(21) Appl. No.: 10/829,646

(22) Filed: Apr. 21, 2004

(65) Prior Publication Data

US 2005/0251646 A1    Nov. 10, 2005

(51) Int. Cl.
*G06F 13/00* (2006.01)
(52) U.S. Cl. .......................................... 710/10; 710/100
(58) Field of Classification Search .................. 710/10, 710/3, 100, 240
See application file for complete search history.

(56) References Cited

U.S. PATENT DOCUMENTS 4,539,655 A * 9/1985 Trussell et al. ............. 710/100
6,584,535 B1 * 6/2003 Ouellet et al. .............. 710/305
2002/0107952 A1 * 8/2002 Mancusi et al. ............ 709/223
2004/0210693 A1 * 10/2004 Zeitler et al. ............... 710/100

* cited by examiner

Primary Examiner—Henry W. H. Tsai
(74) Attorney, Agent, or Firm—Calvin B. Ward

(57) ABSTRACT

A circuit having an interconnect network and plurality of processing blocks is disclosed. The interconnect network has a plurality of network nodes arranged in a two-dimensional array on a first substrate. Each network node has a plurality of communication ports and is connected to each adjacent network node by a communication bus that connects only those two network nodes and processing blocks adjacent to that communication bus. A programmable switch within each node connects one of the input ports to one of the output ports in response to connection information stored in a memory in that node. Three-dimensional embodiments can be constructed by including a second substrate that overlies the first substrate and includes a second such interconnect network that is connected vertically through one or more nodes. The circuit easily accommodates spare processing blocks that can be substituted for defective blocks by altering the connection information.

9 Claims, 4 Drawing Sheets

NETWORK WITH PROGRAMMABLE INTERCONNECT NODES ADAPTED TO LARGE INTEGRATED CIRCUITS

BACKGROUND OF THE INVENTION

Customized integrated circuits that implement complex data processing and control systems provide significant cost advantages over systems constructed from standardized packaged components that are interconnected on printed circuit boards and the like. These customized circuits can be viewed as being constructed from a number of standardized processing blocks that are connected together by buses on a single silicon chip. The size of these circuits as well as the clock rates used in the individual processing blocks has steadily increased over time. As a result, it has become difficult to synchronize all of the computations to a single processing clock. Accordingly, a class of customized integrated circuits in which the individual processing blocks utilize synchronous processing based on a local clock and communicate with each other asynchronously has evolved.

The combination of this semi-asynchronous system design and a three-dimensional integrated circuit design holds the promise of providing substantial improvements in the size and complexity of such customized integrated circuits. In the following discussion, a large semi-asynchronous system will be referred to as a "system on a chip" or SOC. For example, one class of three-dimensional integrated circuit is constructed by stacking individual chips utilizing high-density vertical interconnections. When a SOC is constructed in such a three-dimensional structure, the effective size of the SOC is greatly increased, because the length of the bus line connecting the various components can be substantially reduced because the individual components are separated by smaller distances in space.

However, as the size of an SOC increases, other problems are encountered. First, the yield of devices decreases because of defects in either the individual processing blocks or the bus lines connecting these blocks. To overcome this problem in large circuits, redundant blocks can be included in integrated circuits that are constructed from blocks that are present in large numbers. For example, large memories are constructed from a large number of small memory blocks that are connected to a common bus. These spare blocks are used to replace blocks that are found to be defective when the devices are tested. In conventional two dimensional circuits in which the individual components are wired to a common bus and the circuit elements are accessible to the re-wiring equipment, the defective blocks can be removed by disconnecting the blocks from the bus lines and a spare block can be connected to the bus in place of the defective block provided the bus is not defective. In these systems, switches are built into each block to provide the disconnect function. In more complex circuit designs, a relatively large number of buses are utilized to connect the components. In the extreme case, each pair of components is connected by a bus that runs just between those components.

Consider a case in which two components are connected by a local bus that runs only between those components. If one of the components fails, wiring in a spare component is difficult unless the spare is located close to the local bus. If the spare is located at a substantial distance, a new bus must be constructed to connect the spare to the original bus. Since providing new buses is difficult, such systems require the spare to be constructed adjacent to the component that it is to replace. This substantially increases the number of spare components that must be placed on the chip since any given spare can only act as a backup for a relatively small number of like parts, even though there are many other parts of that type in the SOC.

A second problem with these very large SOCs relates to the design of the buses themselves. If there are a large number of widely spaced components that are connected by buses dedicated to just those components, the routing of the buses on the chips becomes a complex design problem that further increases the cost of the SOC.

A third problem with SOCs that utilize a large number of local buses relates to the problem of testing the individual components. A spare cannot be inserted in place of a component if the components cannot be tested to determine those that are defective. In systems in which all of the components are connected via a single bus, the testing system can address each of the components separately provided the remaining components can be effectively disconnected from the bus. If, however, the SOC has a large number of local buses, the test system cannot access the individual components without going through other components unless a separate test bus is provided that connects all of the components that are to be tested. Such test buses require chip area and add complexity to the systems. After the devices have been tested, the test structure is of little use, and hence, represents wasted silicon area.

Systems in which a large number of processing blocks are connected to, and share, the same communication bus also suffer from bus contention problems. In such systems, the communication bus can become a bottleneck that limits the performance of the system.

SUMMARY OF THE INVENTION

The present invention includes a circuit having an interconnect network and a plurality of processing blocks. The interconnect network includes a plurality of network nodes arranged in a two-dimensional array on a first substrate. Each network node has a plurality of adjacent network nodes and is connected to each adjacent network node by a communication bus that connects only those two network nodes and the processing blocks adjacent to that communication bus. Each network node includes a plurality of communication ports. Each communication port includes an input port for receiving digital signals and an output port for transmitting digital signals on a bus connected to that communication port. A programmable switch within each network node connects one of the input ports to one of the output ports in response to connection information stored in a memory in that network node.

In one embodiment, the connection information is stored in the network nodes prior to the processing blocks commencing the processing functions. In one embodiment, the circuit also includes a programming bus for transmitting the connection information to each of the network nodes.

Three-dimensional embodiments of the invention can be constructed by including a second substrate that overlies the first substrate and includes an interconnect network having a plurality of network nodes arranged in a two-dimensional array on the second substrate. Each network node has a plurality of adjacent network nodes on the second substrate and is connected to each adjacent network node on the second substrate by a communication bus that connects only those two network nodes on that substrate and processing blocks on that substrate that are adjacent to that bus. At least one of the network nodes on the second substrate is connected to a corresponding network node on the first substrate by a bus that connects only those two network nodes.

In one embodiment, one of the processing blocks is a spare processing block that is capable of performing processing functions that are normally performed by a second one of the processing blocks if the second one of the processing blocks is defective. In one embodiment, one of the processing blocks provides the connection information that is stored in the network nodes.

DETAILED DESCRIPTION OF THE PREFERRED EMBODIMENTS OF THE INVENTION

The present invention overcomes the limitations noted above by utilizing a standard interconnect infrastructure that allows SOC designers to design SOCs by connecting processing blocks that communicate with each other utilizing a common protocol to the interconnect infrastructure and specifying the connections that are to be made. The standard infrastructure includes a matrix of routing nodes that are connected to one another by a grid of metal traces.

Figure 1:
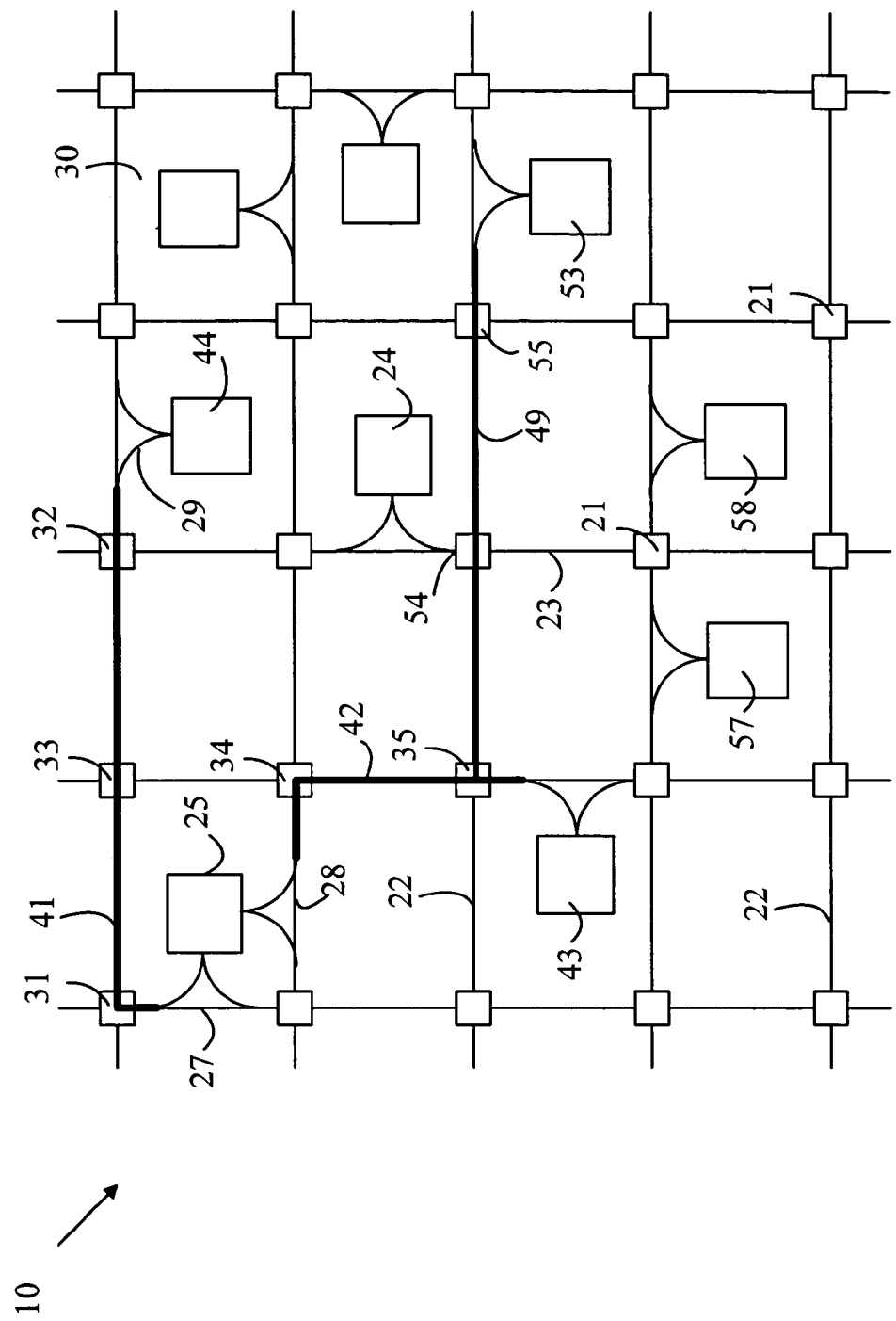
FIG. 1 illustrates a portion of an SOC that utilizes an interconnect infrastructure according to one embodiment of the present invention.

Refer now to FIG. 1, which illustrates a portion of an SOC 10 that utilizes the interconnect infrastructure of the present invention. SOC 10 is constructed from a number of processing blocks that are connected to an interconnect infrastructure that includes a grid work of horizontal and vertical buses that are connected at nodes. Exemplary processing blocks are shown at 24. Exemplary horizontal and vertical buses are labeled at 22 and 23, respectively. The nodes connecting these buses are shown at 21. The processing blocks are connected to one or more of the buses by couplers 27–29.

The surface of the chip on which SOC 10 is constructed is divided into a plurality of cells 30 that are bounded by the buses discussed above. Each cell can be empty or can contain one or more processing blocks. As will be explained in more detail below, during the operation of the SOC, each node is programmed to provide a fixed connection between the bus and the various ports of the nodes. Hence, the interconnect infrastructure appears to be a fixed bus network that connects the various processing blocks. For example, nodes 31, 32, and 33 can be programmed to provide a virtual bus 41 connecting processing blocks 25 and 44. Similarly, nodes 34 and 35 can be programmed to provide a second virtual bus 42 connecting processing blocks 25 and 43. Furthermore, these two virtual buses can operate independently of one another, and hence, provide the functionality of local buses.

The present invention is well suited to applications requiring repair and redundancy. Assume that it is found that processing block 43 is defective and that processing block 53 is a spare processing block that can provide the same data processing functionality. In this case, nodes 35, 54, and 55 are programmed such that a new local bus 49 is created that connects processing block 25 to processing block 53, and node 35 is programmed to direct the traffic previously sent to processing block 43 to node 54 instead. It should be noted that if processing blocks 57 and 58 were also of the same type as processing block 43, processing block 53 could be used as a spare for those blocks as well. Hence, only one spare, located at a remote location, is needed to replace one of the processing blocks if a defective block is determined during testing of the SOC.

Figure 2:
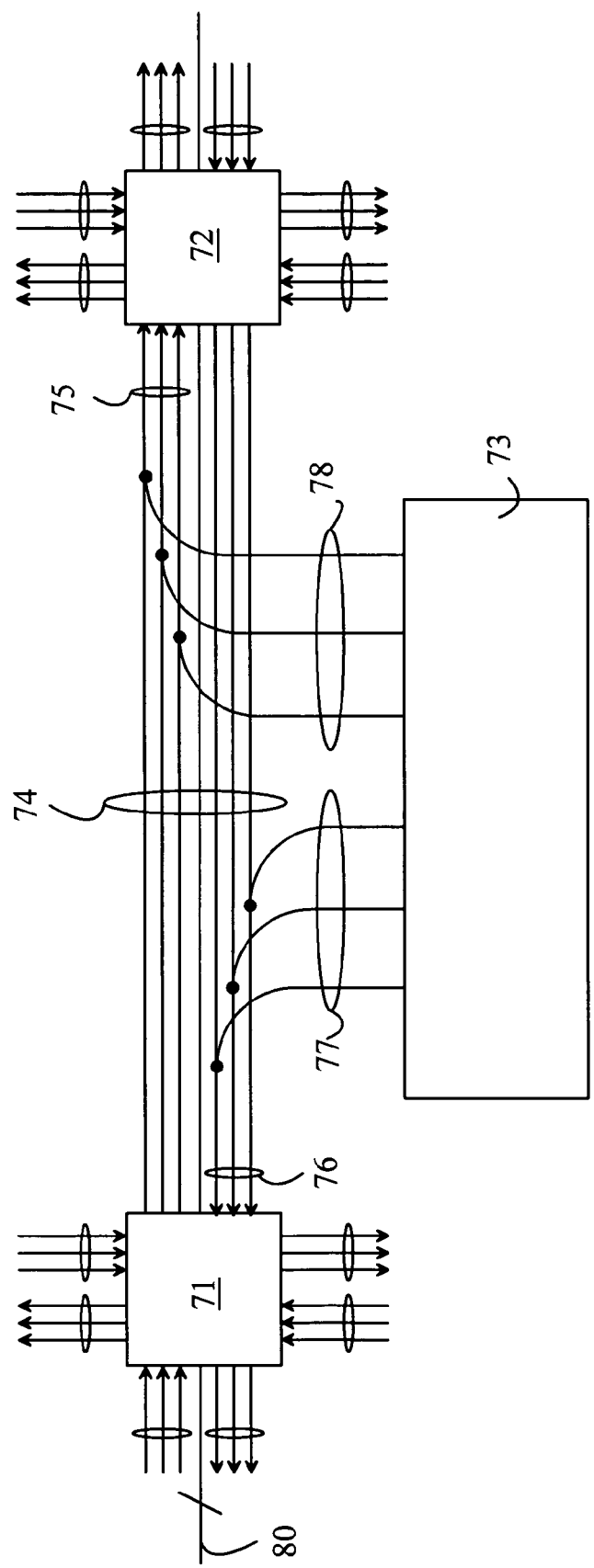
FIG. 2 is a more detailed view of a portion of the interconnect infrastructure shown in FIG. 1.

Refer now to FIG. 2, which is a more detailed view of a portion of the interconnect infrastructure between two nodes, 71 and 72. A data bus 74 connects each pair of nodes. In the embodiment shown in FIG. 2, data bus 74 includes two unidirectional sub-buses shown at 75 and 76. Each sub-bus includes three unidirectional data paths that carry data, clock, and frame signals, respectively. Data from a processing block such as block 73 is coupled to the sub-buses via the local buses shown at 77 and 78, which will be referred to as off ramps and on ramps, respectively. While only one processing block with one set of on and off ramps is shown in the drawing, embodiments having multiple on and off ramps and/or multiple processing blocks can be constructed. In this embodiment, the communication protocol of the bus is a high-speed serial protocol. However, other bus designs and communication protocols can be utilized.

Each of the nodes shown in FIG. 2 includes 8 data ports, one input port and one output port for each of the four directions of data propagation. In this embodiment, any input data port can be connected to any output data port. There are three types of connections that can be made. The simplest connection is merely a one-to-one connection in which one output port is connected to precisely one input port. In such an arrangement, there is no possibility of a data collision at the node unless multiple on ramps are present on the sub-bus corresponding to the input port in question. The second type of connection is a "broadcast" connection in which the data on the input port is connected to multiple output ports. In this arrangement, there is also no possibility of data collisions unless there are multiple on ramps.

The third type of data connection is one in which multiple input ports are connected to single or multiple output ports. For simplicity, consider the case in which there is only one output port involved. In this arrangement, there is a possibility of having a data collision if a processing block on a first input port attempts to send data at the same time that a processing block on another input attempts to send data. The present invention provides a mechanism for arbitrating such situations by utilizing the frame line in the sub-buses and requiring that a processing block examine the frame line before sending data. If the frame line indicates that the bus is busy, the processing block must wait to send the data. Since this embodiment assumes a serial bus transfer protocol that requires some form of handshaking protocol before data is sent, data collisions are not a problem.

In this embodiment of the present invention, the routing configuration executed at each node is stored in a memory in that node. As will be explained in detail below, the stored data sets the state of a number of multiplexers in the node. In the embodiment shown in FIG. 2, the configuration information is sent to the various nodes over a dedicated configuration bus 80 that connects all of the nodes. Each node includes a node address that identifies that node and is stored in the node. Hence, each node can recognize commands to that node that are sent on the configuration bus.

The configuration information can be provided at the time the SOC is tested. The test can be performed at the fabrication facility or each time the SOC is powered up. If the test is a one-time test at the factory, the memory in the nodes must be non-volatile.

The nodes can also be used during the test procedure to direct test signals to the various processor blocks and record the responses of those blocks by sending appropriate routing connection information to the nodes. Hence, the interconnect infrastructure also provides the function of a test bus without the overhead of having a separate bus even though the operational configuration of the SOC implements a large number of local buses.

The node configuration information can also be used to test the interconnect infrastructure to identify faulty nodes. It should be noted that faults at the nodes are expected to be relatively rare, as the probability of a fabrication fault is proportional to the area of silicon occupied by the device, and the relative area occupied by the nodes is quite small. A fault at a node can be detected by configuring the node to a predetermined connection configuration and then routing signals through that node using other nodes and buses that have already been tested.

Figure 3:
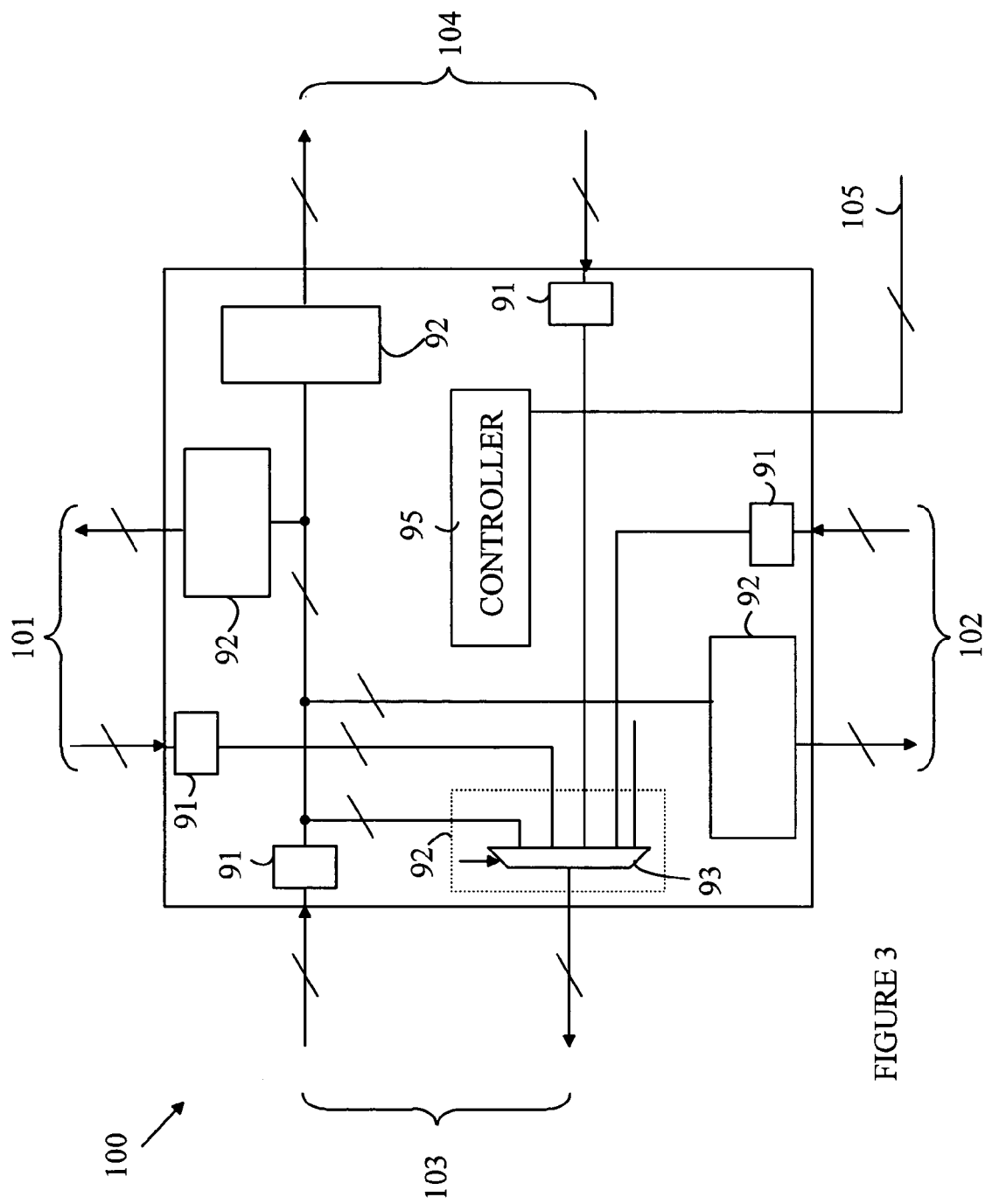
FIG. 3 is a block diagram of a node according to one embodiment of the present invention.

Refer now to FIG. 3, which is a block diagram of a node 100 according to one embodiment of the present invention. Node 100 has four input/output ports 101–104. Each input port 91 has a driver that receives the three bus lines and connects the received signals to the output ports in each of the input/output ports. To simplify the drawing, only the connections from the input port driver in port 103 to the four output ports have been shown in the drawing.

Each output port 92 includes a 5:1 multiplexer 93 that selects the signals that are to be sent via that output port. To simplify the drawing, only the multiplexer associated with the output port of input/output port 103 is shown explicitly in the drawing. Four of the multiplexer inputs are connected to the input ports 91 from each of the input/output ports. The fifth port has its 3 conductors tied to a logical 0 to define the state on startup. The state of each multiplexer is set by the contents of a register associated with that multiplexer. In the embodiment shown in FIG. 3, the state registers are contained within controller 95. To simplify the drawings, the connections between controller 95 and the various input and output ports have been omitted from the drawing. It should be noted that the multiplexers shown in FIG. 3 each switch all three of the signals, clock, data, and frame, to the corresponding three signal lines on the bus connected to that multiplexer. In essence, each multiplexer shown in FIG. 3 represents three simple multiplexers, one for each signal.

As noted above, embodiments of the present invention that accommodate branching within the nodes can be constructed. Although one input port can easily drive many output ports, it is not possible for many outputs ports to drive one input port at the same time without the possibility of a data collision occurring. In embodiments that allow many-to-one or many-to-many branching, the control circuitry together with the configuration information for the affected multiplexer determines which input port is actually coupled to the output port by the multiplexer, many-to-many configurations are available using two or more ports executing the many-to-one strategy.

In one embodiment of the present invention, only one of the branches entering a node is able to actually drive the output port ("the trunk") at any given time. In this embodiment, the multiplexer on the trunk is set to connect all of the possible input ports to the output port. If one of the branches becomes active, the remaining branches are temporarily disconnected to prevent a collision. Since the device driving that disconnected branch will not be able to make a connection, the normal serial transmission handshaking protocols will prevent the loss of any data.

The frame signal determines which branch is chosen for coupling to the output port in this embodiment. The frame signal is active whenever a circuit is driving from its output. Hence, the frame signal will be active on the input port that is currently driving the trunk. The controller monitors the frame signals, and chooses which branch to select based on the framing signal's presence combined with the routing data that is stored in the nodes configuration memory in the controller. In this embodiment, the other inputs to the multiplexer are disconnected.

It should be noted that this embodiment still allows other routing paths through the node to be utilized. For example, consider a case in which the first and second ports are connected to the third port such that data entering either of these ports is routed out of the third port. If the first port actually makes a connection through the node, the frame signal on the input side of the first port will become active. This will cause the connection between the input side of the second port and the multiplexer in the output side of the third port to be broken. However, a signal that is to be routed from the fourth port's input side to the output side of the first or second port can still be routed during this period.

In another embodiment, the presence of a frame signal on one input port, automatically blocks the input sides of the other ports. This embodiment requires less circuitry to implement. However, it also provides less flexibility, since the independent routing of signals via other ports is not allowed. However, this reduced capability will only apply to nodes that are executing a many-to-one connection that are also executing another independent connection path.

The routing information is stored in a memory in controller 95. In one embodiment, the memory is a shift register that is loaded from configuration bus 105. On power-up, the configuration register is reset such that all of the output multiplexers select the $5^{th}$ input discussed above and drive 0's onto their respective output lines. Data from the configuration bus is then addressed to each of the nodes and loaded into the configuration register. The output of the configuration register is latched such that the multiplexers retain their routing information while the configuration register is loading new configuration data. After all of the nodes have been loaded, the new configuration data is moved to the latches.

The above-described embodiments of the present invention relate to two-dimensional SOCs, i.e., SOCs composed of processing blocks and an interconnect infrastructure that are located on a single substrate slab. However, embodiments of an interconnect infrastructure that operate in three dimensions can also be constructed in an analogous manner. The present invention is particularly useful in stacked integrated circuits, since such circuits have many times the number of processing blocks per circuit. Hence, the probability that one of the processing blocks in the SOC is defective is substantially higher than in a two-dimensional SOC. In addition, the processes involved in stacking and bonding the various layers of the stack introduce additional faults that must be accommodated.

Stacked integrated circuits are constructed from a plurality of chips that are stacked on top of one another with conductors that run vertically through the stack. The vertical conductors provide signal paths and power connections. Such stacked circuits can be produced by stacking entire wafers and then segmenting the stacked wafer in individual three-dimensional chips or by stacking individual chips after the chips have been cut from the wafer. The mechanisms for aligning and bonding the various layers in a stack are discussed in numerous patents, and hence, will only be discussed here to the extent that the details are relevant to the interconnect infrastructure and SOC topology of the present invention.

Figure 4:
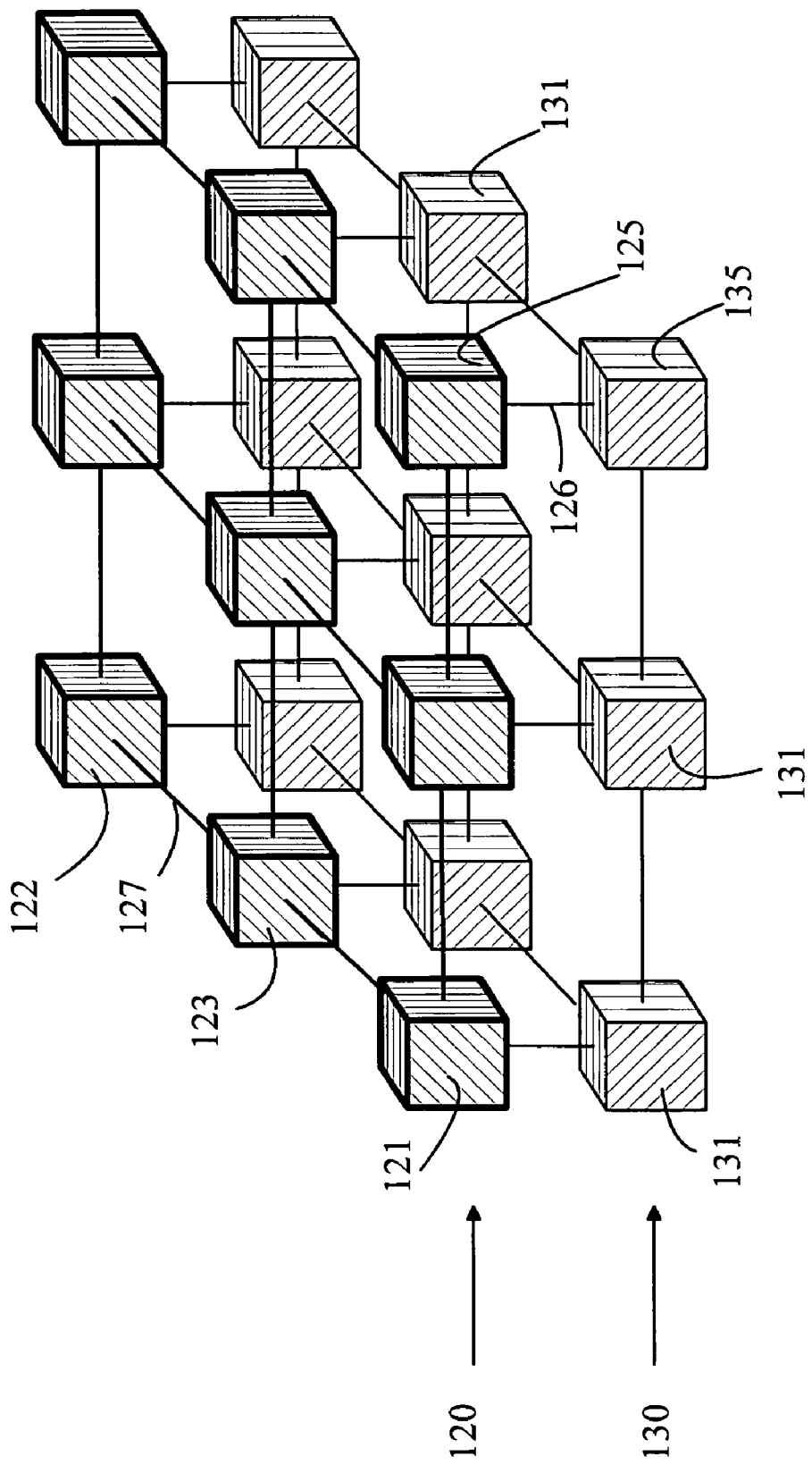
FIG. 4 illustrates a portion of a three-dimensional interconnect infrastructure according to one embodiment of the present invention.

In one embodiment of a three-dimensional interconnect infrastructure according to the present invention, each routing node is connected to buses running in six directions. The first four directions connect the node to buses running within the layer in which the node is constructed. The remaining directions correspond to buses that run from the current slab to the layers above or below the current layer. Refer now to FIG. 4, which illustrates a portion of a three-dimensional interconnect infrastructure according to such an embodiment of the present invention. The portion of the interconnect infrastructure shown in the figure is limited to two layers shown at 120 and 130. Within each layer there is a two-dimensional array of routing nodes that are connected by buses. Exemplary routing nodes in layer 120 are shown at 121–123, and exemplary routing nodes in layer 130 are shown at 131 and 135. For example, nodes 122 and 123 in layer 120 are connected by a bus 127 that runs in that layer. The nodes in the two layers are connected by vertical buses such as bus 126 that connects node 125 in layer 120 to node 135 in layer 130.

To simplify the drawing, the processing blocks have been omitted from FIG. 4. However, it is to be understood that processing blocks are present on at least one of the substrates. In general, a processing block is connected to one or more routing nodes on the substrate on which that processing block is located.

Since the example shown in FIG. 4 has only two layers, none of the nodes have all 6 routing ports corresponding to the six possible directions discussed above. However, it is to be understood that one or more of the nodes in layer 120 would include ports and buses running upwards if another layer was present above layer 120. While the arrangement shown in FIG. 4 has vertical connects between each node in layer 120 and the corresponding node in layer 130, it is to be understood that embodiments in which some of the nodes are not connected vertically to the corresponding nodes above or below those nodes can also be constructed.

The interface nodes have a structure analogous to those discussed above with reference to FIG. 3 except that each node has two additional ports, and the multiplexers must accommodate the bus lines from the additional ports. In addition, the amount of information that must be stored in the controller to set the configuration of each multiplexer is somewhat larger.

It should be noted that the interconnect infrastructure structure of the present invention is well suited to SOC's that include test processors for identifying faults that occur after the SOC is placed in use. In such a system, one or more of the processing blocks discussed with reference to FIG. 1 can provide the test functions on power up. If a component is determined to be defective, the processing block can determine if there is a spare processing block that can be substituted for the defective block. If such a spare processing block exists, the test processor determines the changes in the routing network that are needed to substitute the spare processing block for the defective processing block and institutes those changes in the routing patterns at the end of the test cycle. At the end of the test cycle, the test processor sets the various routing nodes to the connection pattern stored in the test processor. This connection pattern is stored in a non-volatile memory.

Various modifications to the present invention will become apparent to those skilled in the art from the foregoing description and accompanying drawings. Accordingly, the present invention is to be limited solely by the scope of the following claims.

What is claimed is:

1. A circuit comprising:
a plurality of processing blocks on a first chip; and
an interconnect network comprising a plurality of network nodes arranged in a two-dimensional array on said first chip, each network node having a plurality of adjacent network nodes and being connected to each adjacent network node by a communication bus that connects only those two network nodes and processing blocks adjacent to that bus;
each network node comprising:
a plurality of communication ports, each communication port comprising an input port for receiving digital signals and an output port for transmitting digital signals on a bus connected to that communication port;
a programmable switch that selectively connects one of said input ports to one of said output ports in response to connection information stored in a memory in that network node, wherein;
each processing block is connected to one of said communication buses and sends and/or receives data on that bus, each processing block performing a predetermined processing function, said processing block being located within said two-dimensional array of network nodes.

2. The circuit of claim 1 wherein said connection information is stored in said network nodes prior to said processing blocks commencing said processing functions.

3. The circuit of claim 1 further comprising a programming bus for transmitting said connection information to each of said network nodes.

4. The circuit of claim 1 wherein each of said buses is a serial bus.

5. The circuit of claim 1 wherein said two dimensional array comprises a rectangular array in which said network nodes are organized as a plurality of rows and columns.

6. The circuit of claim 1 wherein one of said processing blocks specifies said connection information that is stored in each of said network nodes.

7. The circuit of claim 6 wherein said one of said processing blocks also comprises an interface for receiving said connection information from a source external to said circuit.

8. A circuit comprising:
a plurality of processing blocks on a first substrate; and
an interconnect network comprising plurality of network nodes arranged in a two-dimensional array on said first substrate, each network node having a plurality of adjacent network nodes and being connected to each adjacent network node by a communication bus that connects only those two network nodes and processing blocks adjacent to that bus;
each network node comprising:
a plurality of communication ports, each communication port comprising an input port for receiving digital signals and an output port for transmitting digital signals on a bus connected to that communication port;
a programmable switch that selectively connects one of said input ports to one of said output ports in response to connection information stored in a memory in that network node, wherein;

each processing block is connected to one of said communication buses and sends and/or receives data on that bus, each processing block performing a predetermined processing function, said processing block being located within said two-dimensional array of network nodes, said circuit further comprising:

a second substrate that overlies said first substrate, said second substrate comprising an interconnect network comprising a plurality of network nodes arranged in a two-dimensional array on said second substrate, each network node having a plurality of adjacent network nodes and being connected to each adjacent network node by a communication bus that connects only those two network nodes;

each network node comprising:

a plurality of communication ports, each communication port comprising an input port for receiving digital signals and an output port for transmitting digital signals on a bus connected to that communication port;

a programmable switch that selectively connects one of said input ports to one of said output ports in response to connection information stored in a memory in that network node, wherein at least one of said network nodes on said second substrate is connected to a corresponding network node on said first substrate by a bus that connects only those two network nodes.

9. A circuit comprising:

a plurality of processing blocks on a first substrate; and an interconnect network comprising a plurality of network nodes arranged in a two-dimensional array on said first substrate, each network node having a plurality of adjacent network nodes and being connected to each adjacent network node by a communication bus that connects only those two network nodes and processing blocks adjacent to that bus;

each network node comprising:

a plurality of communication ports, each communication port comprising an input port for receiving digital signals and an output port for transmitting digital signals on a bus connected to that communication port;

a programmable switch that selectively connects one of said input ports to one of said output ports in response to connection information stored in a memory in that network node, wherein;

each processing block is connected to one of said communication buses and sends and/or receives data on that bus, each processing block performing a predetermined processing function, said processing block being located within said two-dimensional array of network nodes, said circuit wherein one of said processing blocks is a spare processing block that is capable of performing processing functions that are normally performed by a second one of said processing blocks if said second one of said processing blocks is defective.

* * * * *